(12) United States Patent
Singleton et al.

(10) Patent No.: US 9,301,517 B2
(45) Date of Patent: Apr. 5, 2016

(54) INSECT TRAP RELEASE MECHANISM

(71) Applicant: Helen of Troy Limited, St. Michael (BB)

(72) Inventors: Michael Singleton, Warwick, RI (US); Robert Alan Barker, Berlin, MA (US); Ashkan Nowtash, Boston, MA (US)

(73) Assignee: Helen of Troy Limited, St. Michael (BB)

( * ) Notice: Subject to any disclaimer, the term of this patent is extended or adjusted under 35 U.S.C. 154(b) by 172 days.

(21) Appl. No.: 14/216,308

(22) Filed: Mar. 17, 2014

(65) Prior Publication Data

US 2014/0259877 A1    Sep. 18, 2014

Related U.S. Application Data

(60) Provisional application No. 61/790,585, filed on Mar. 15, 2013.

(51) Int. Cl.
*A01M 1/20*   (2006.01)
*A01M 23/02*  (2006.01)
*A01M 1/02*   (2006.01)
*A01M 1/10*   (2006.01)

(52) U.S. Cl.
CPC .............. *A01M 23/02* (2013.01); *A01M 1/02* (2013.01); *A01M 1/106* (2013.01)

(58) Field of Classification Search
CPC ......... A01M 1/00; A01M 1/02; A01M 1/026; A01M 1/10; A01M 1/106; A01M 1/20; A01M 1/2016; A01M 1/2005; A01M 23/02; A01M 23/08
USPC .......................................... 43/107, 132.1, 133
See application file for complete search history.

(56) References Cited

U.S. PATENT DOCUMENTS

| 4,706,410 A * | 11/1987 | Briese ..................... A01M 1/02 43/107 |
| 2004/0231229 A1* | 11/2004 | Lenker ..................... A01M 1/02 43/107 |
| 2013/0152452 A1* | 6/2013 | Lazzarini ................ A01M 1/02 43/114 |

* cited by examiner

*Primary Examiner* — Christopher P Ellis
*Assistant Examiner* — Richard G Davis
(74) *Attorney, Agent, or Firm* — Stroock & Stroock & Lavan LLP (57) ABSTRACT

A pest trap, such as for flies, includes a disposable bag with a lure therein, and a sealing mechanism set at or near the top of the bag. The sealing mechanism engages with a removable top, which covers a canister. The bag with sealing mechanism is connected to the top, and then the top is placed on the canister, with the disposable bag in the canister. Once the bag has become filled with pest insects, the sealing mechanism is activated, which seals the top of the bag and separates the bag from the top. The top can then be removed from the canister, and the canister upended to dump the disposable bag into the garbage.

14 Claims, 12 Drawing Sheets

INSECT TRAP RELEASE MECHANISM

CROSS-REFERENCE TO RELATED APPLICATIONS

This application claims the benefit of U.S. Provisional Application No. 61/790,585, filed Mar. 15, 2013, the contents of which are incorporated herein by reference.

BACKGROUND OF THE INVENTION

1. Field of the Invention

The present invention generally relates to traps for pests, such as flying insects. In particular, the present invention relates to a release mechanism for easy disposal of water-based traps.

2. Description of the Related Art

Devices are known that attract and eliminate flies and various other types of insects that are lured by scent. An attractant (i.e., a lure) inside a sealed bag mechanism is activated by adding water and gives off a strong scent, which lures flies and other insects to enter the trap, where they eventually drown.

A problem with such traps, however, is that disposal of the bag, which is filled with water and insects, can be a messy operation. It is therefore desirable to provide a trap that supports easy disposal of the bag without spilling or requiring users to handle the bag.

SUMMARY OF THE INVENTION

Various embodiment traps include a release mechanism that provides convenient, spill-proof disposal. In preferred embodiments, the lure comes pre-packaged in a disposable plastic bag, which is connected to the release mechanism. When tabs on top of the trap are pressed, they cause the bag to be sealed and released in a single step for easy disposal.

BRIEF DESCRIPTION OF THE DRAWINGS

The various aspects and embodiments disclosed herein will be better understood when read in conjunction with the appended drawings, wherein like reference numerals refer to like components. For the purposes of illustrating aspects of the present application, there are shown in the drawings certain preferred embodiments. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The drawings are not necessarily drawn to scale and are not in any way intended to limit the scope of this invention, but are merely presented to clarify illustrated embodiments of the invention. In these drawings.

DETAILED DESCRIPTION OF THE PREFERRED EMBODIMENTS

In a preferred embodiment of the invention, a release mechanism that delivers convenient, spill-proof disposal is provided for a pest lure that includes a plastic bag and related lure and trap. With the release mechanism, the consumer never has to directly handle the contents of the disposable bag.

A first embodiment pest trap 100 is shown in FIGS. 1-8. The trap 100 includes a canister 110 and a top 120. Canister 110 defines a containment space with an opening 114, which is used for accepting a disposable bag 142. Disposable bag 142 is selectively sealed by a bag sealing mechanism 140. In preferred embodiments, a top edge of bag 142 is glued, welded or the like to sealing mechanism 140. A lure (not shown) is placed within bag 142. Preferably, bag 142 is provided by a manufacturer with the lure already disposed therein, and with bag 142 connected to sealing mechanism 140; that is, bag 142 and sealing mechanism 140 are provided together as a single unit. The sealing mechanism 140 is used by the user to engage bag 142 with top 120, and then the combination of bag 142, lure and bag sealing mechanism 140 are disposed into the containment space of canister 110 via opening 114. Opening 114 is then substantially closed by top 120, but for pest ingress 124 provided in top 120. Top 120 is preferably removably connected to canister 110, and any suitable fitting may be used to couple the two together, such as a threaded fitting, as shown in the figures, a snap fitting, a friction fitting or the like.

Figure 1:
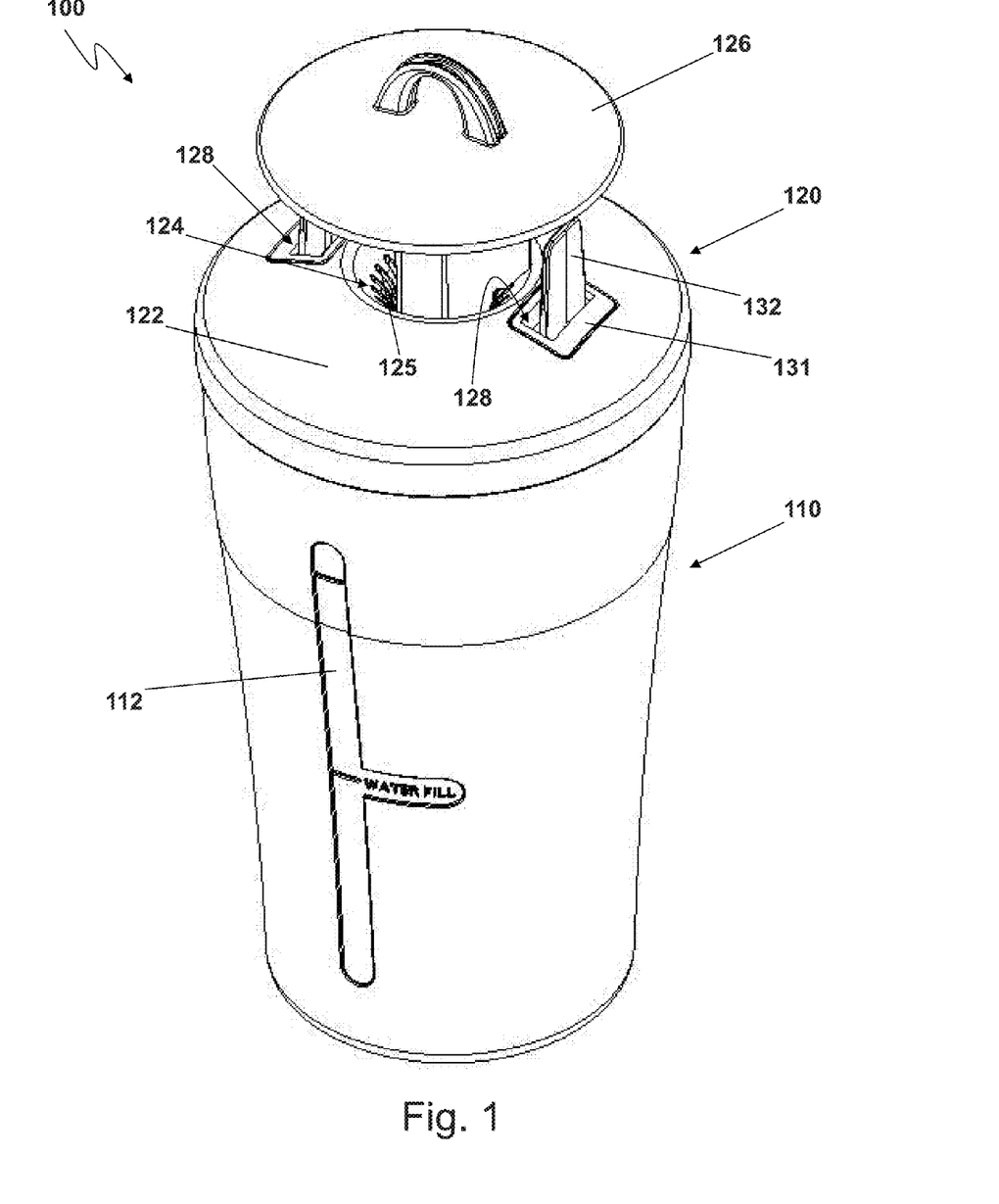
FIG. 1 is a top perspective view of a first embodiment trap.
Figure 2:
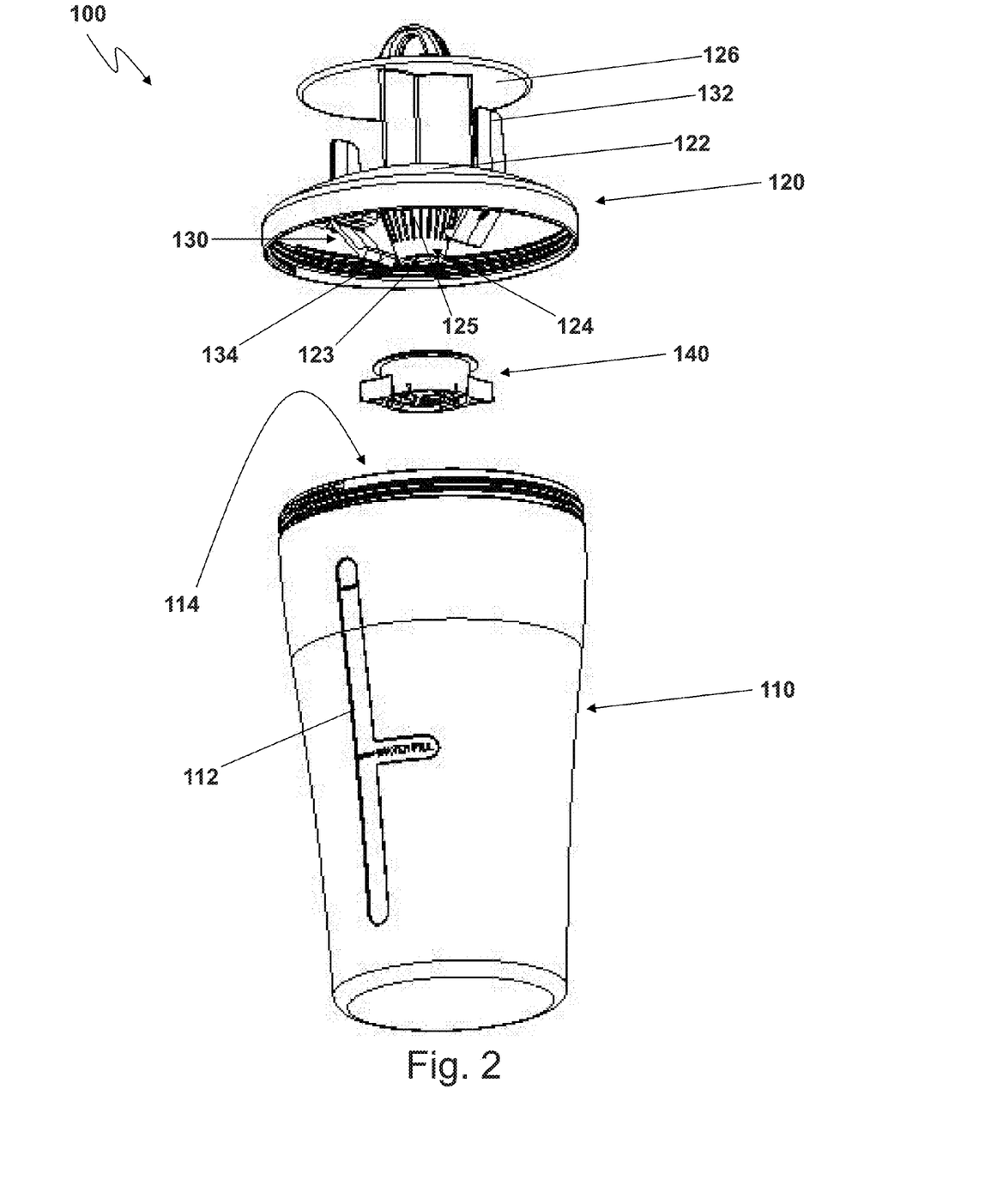
FIG. 2 is an exploded view of the trap shown in FIG. 1.

Canister 110 may include a transparent or translucent window 112 that runs along at least a portion of the longitudinal length of canister 110. Window 112 may be used to view the water level inside bag 142, as well as how full bag 142 has become with the target pests. It will be appreciated that the lure within bag 142 may be constructed to attract one or more types of target pests, and in particular, flies or other types of flying insects. The lure may include a material that releases a scent that attracts the target pests, as is known in the art.

Figure 4:
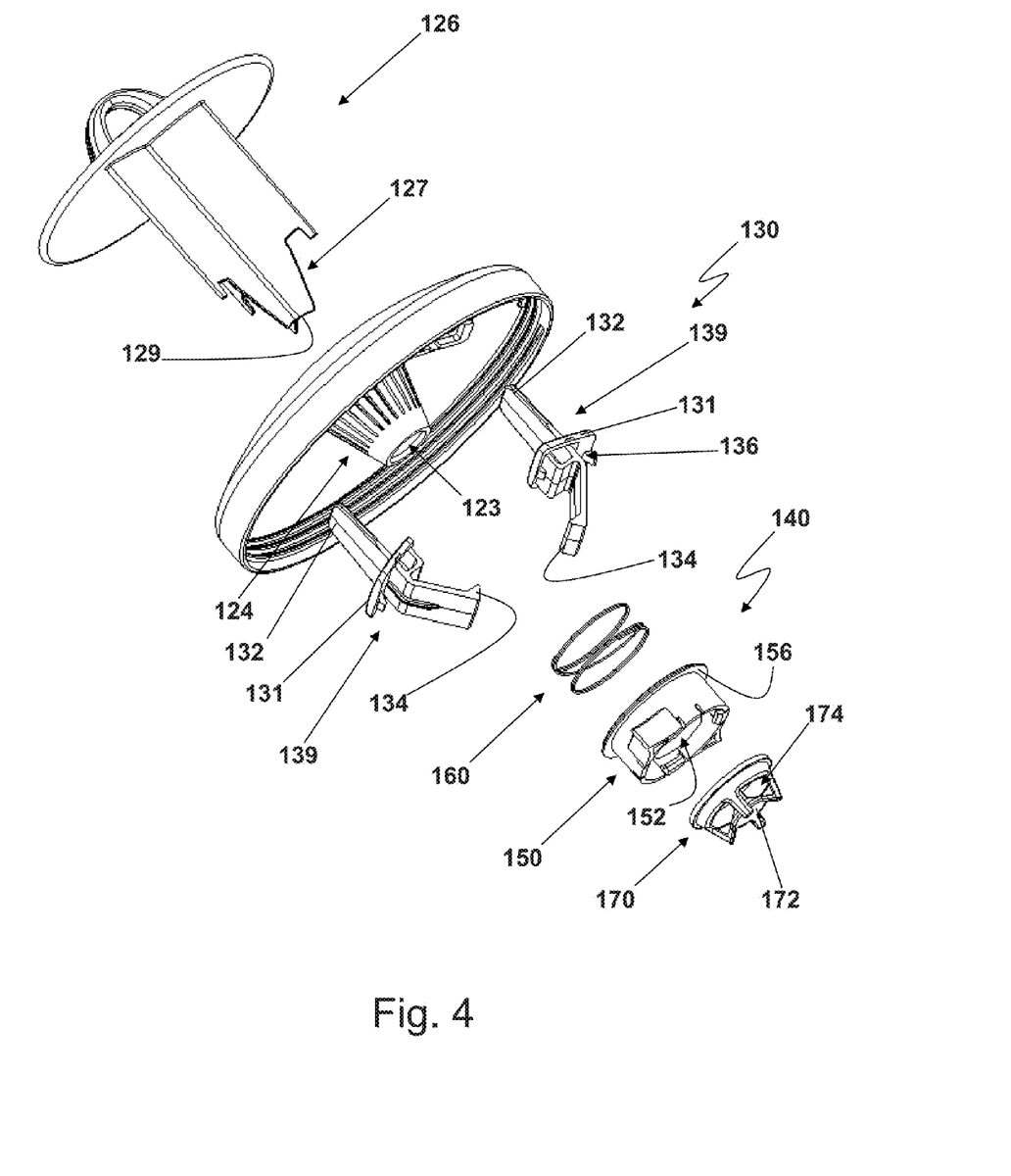
FIG. 4 is an exploded view of a release mechanism assembly and bag sealing mechanism shown in FIG. 1.

Top 120 includes a release mechanism 130 that is used to selectively engage with and disengage from sealing mechanism 140. Release mechanism 130 includes locking levers 139 that extend through respective openings 128 in top 120. Each locking lever 139 includes an actuation end 132 that extends above a top surface 122 of top 120, and a locking end 134 that extends below top surface 122. Each locking lever 139 also has an engaging surface 131 that is configured to fit into, and engage with, a respective opening 128 in top 120, such as by way of a snap fitting, welding, gluing, a friction fitting or the like. Actuation end 132 passes through an opening in engaging surface 131, and couples to the engaging surface 131 by way of an L-shaped lateral extension 136 which contacts the engaging surface 131 thus forming a cantilever or natural lever. Hence, when a user deflects actuation end 132 in one direction, elastic deflection of the contact with natural lever 136 causes locking end 134 to move in an opposite direction. Each locking lever 139 may be integrally formed from plastic, for example.

Top 120 also includes a rain cover 126 that extends above top surface 122 and is used to prevent or reduce the amount of rain entering into canister 110 via pest ingress 124. Pest ingress 124 is preferably formed as a conical surface that extends towards canister 110, having a distal opening 123 sized to pass the target pest, as well as longitudinal slits 125 that are sized smaller than the target pest but which facilitate release of scent from the lure within bag 142. Rain cover 126 has a tapered support 127 that fits into insect ingress 124 such that a distal edge 129 of support 127 is disposed adjacent to opening 123.

Figure 3:
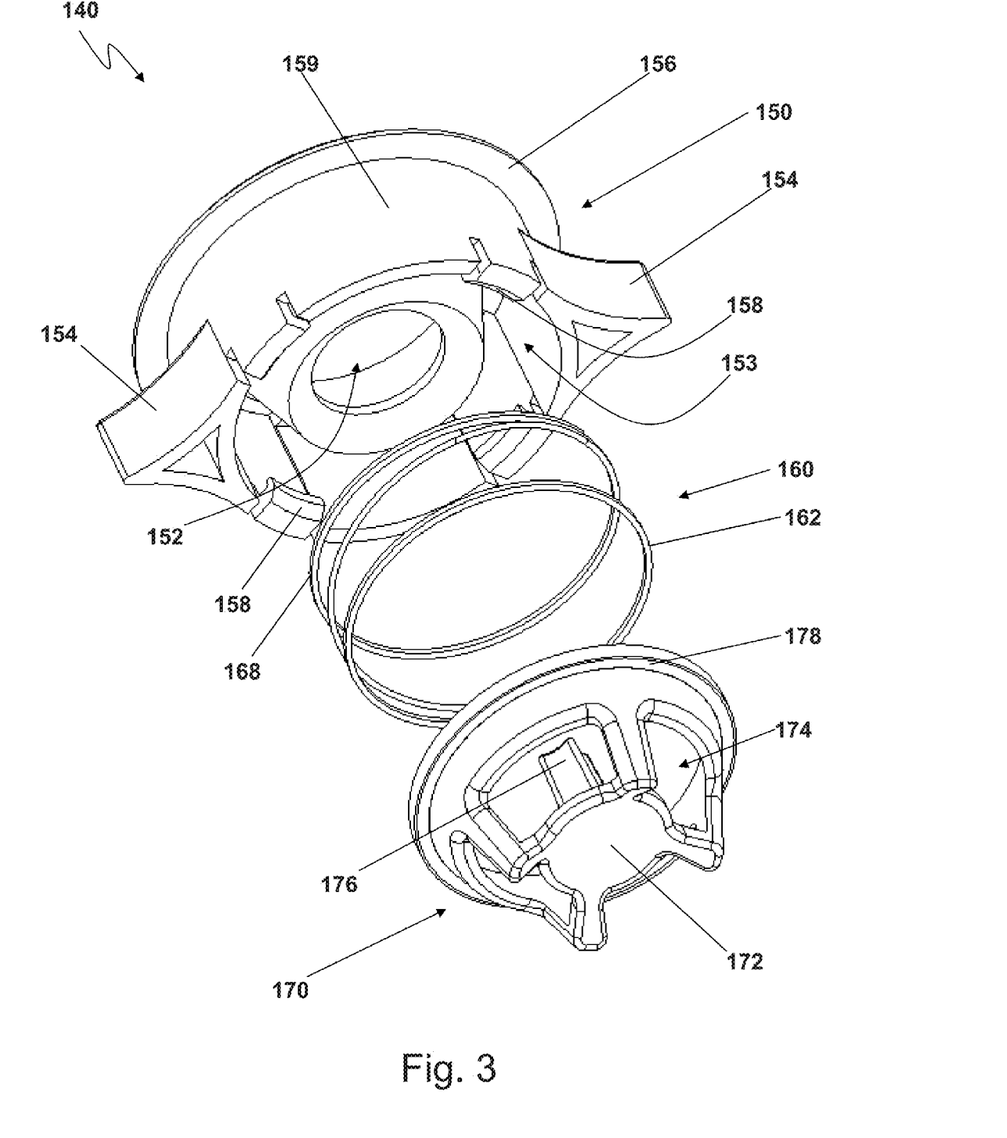
FIG. 3 is an exploded view of a bag sealing mechanism shown in FIG. 1.

Sealing mechanism 140 includes a cap 150, a plug 170 for plugging cap 150, and a biasing member 160 for biasing plug 170 so as to plug cap 150. Biasing member 160 is preferably a spring. In some embodiments biasing member 160 may be formed integrally with either one of cap 150 or plug 170.

Cap 150 includes an opening 152 sized to pass the target pests. Tapered wings 154 extend laterally away from opening 152. Wings 154 are used to couple to bag 142. In particular, a top portion of bag 142 is bonded, such as glued or welded, to wings 154, as well as to the external surface 159 of cap 150 around opening 152. A top portion of cap 150 further includes a flange 156, which is used to mechanically engage with locking ends 134 of locking mechanism 130. A bottom portion of cap 150 includes tabs 158 that engage with biasing member 160.

Plug 170 includes one or more openings 174 sized to pass the target pest. Plug 170 also includes a sealing surface 172 that is sized to block or seal opening 152 in cap 150. Openings 174 are arranged around sealing surface 172. A finger 176 extends away from sealing surface 172 towards hole 152, and is positioned and sized to engage with distal edge 129 of support 127 that is disposed adjacent to opening 123. A top portion of cap 170 further includes a flange 178. Plug 170 is movably disposed in relation to cap 150 so as to be capable of moving between an open state, in which opening 152 is not sealed, and a closed state in which sealing surface 172 substantially closes opening 152. In particular, plug 170 is movably disposed within a region 153 of cap 150 defined between opening 152 and external surface 159. Biasing member 160 is also disposed within this region 153, with a first end 162 engaged with tabs 158 of cap 150, and a second end 168 engaged with flange 178 of plug 170. Hence, when plug 170 is moved so that sealing surface 172 moves axially away from opening 152, biasing member 160 becomes compressed between flange 178 and tabs 158, and thus exerts a force on flange 178 that tends to move sealing surface 172 back towards opening 152 so as to close opening 152.

Figure 5:
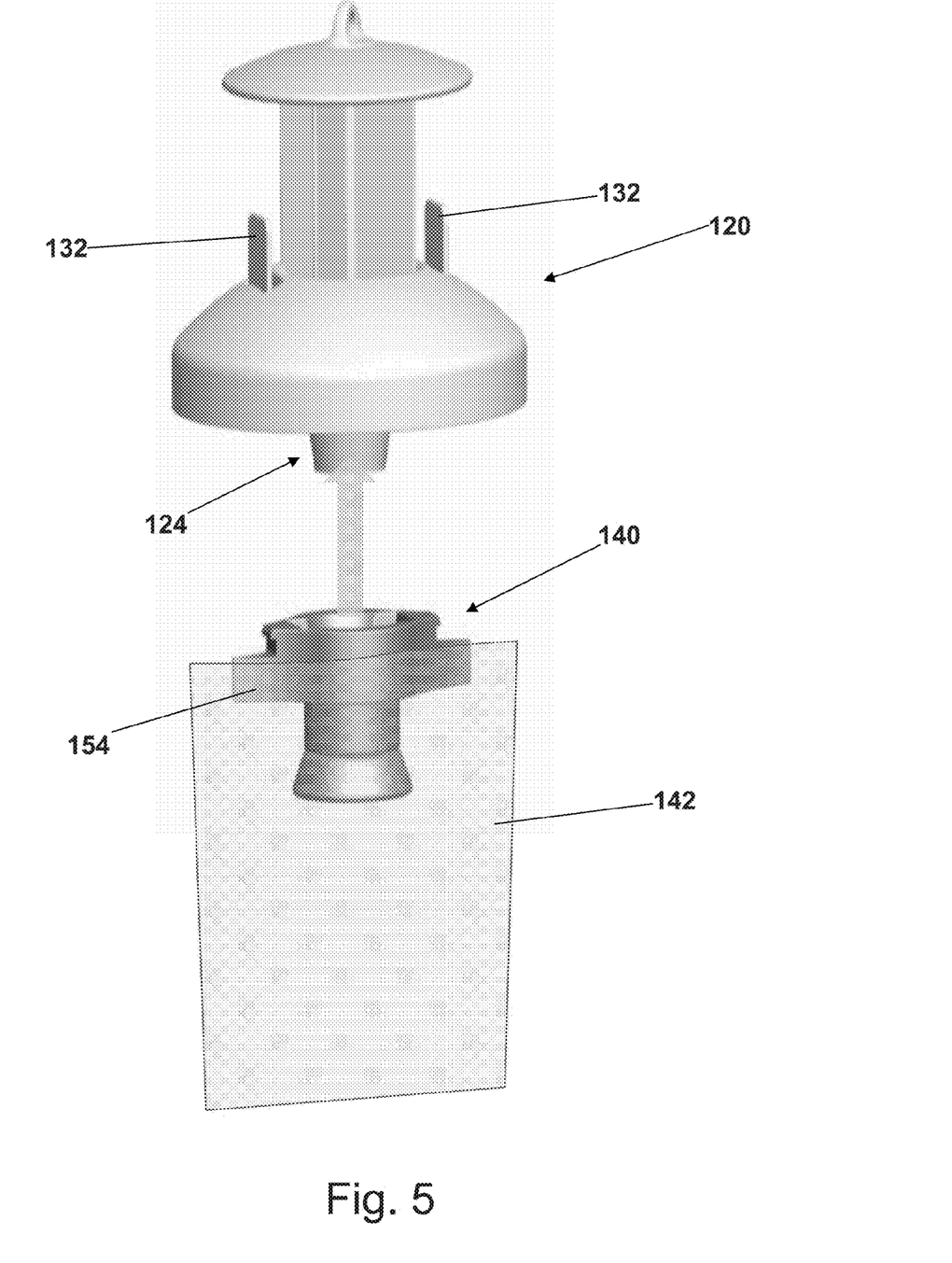
FIG. 5 illustrates assembling a bag with an associated sealing mechanism with a canister top in accordance with an embodiment of the invention.
Figure 6:
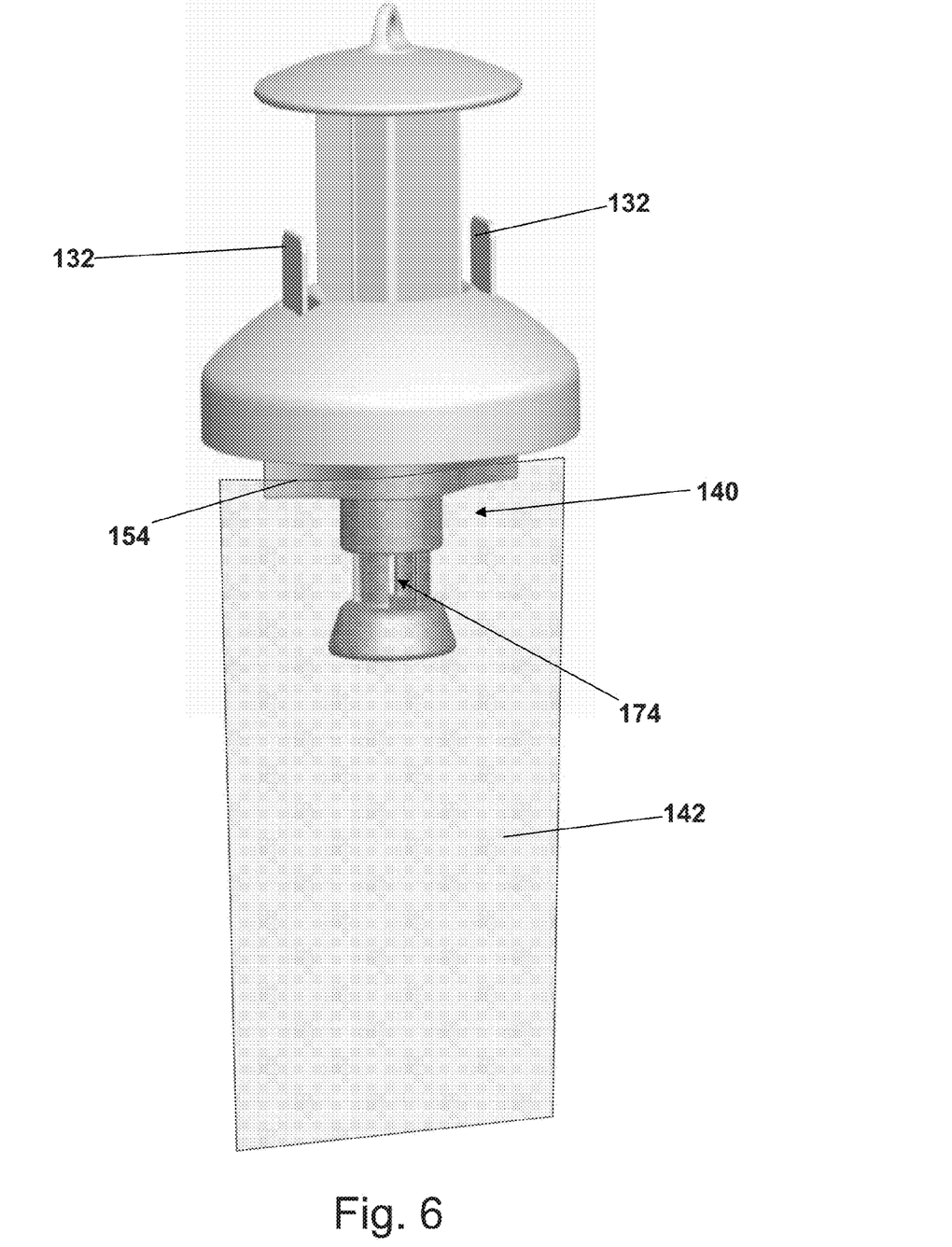
FIG. 6 illustrates completion of the assembly illustrated in FIG. 5.

As illustrated in FIGS. 5 and 6, when bag 142 and its attendant bag sealing mechanism 140 are brought towards opening 123 of pest ingress 124 in top 120, flange 156 of cap 150 engages with locking ends 134 of release mechanism 130, thereby locking together bag sealing mechanism 140 and release mechanism 130, and thus locking bag 142 to top 120. Further, finger 176 of plug 170 contacts distal edge 129 of support 127 so that axial movement of bag sealing mechanism 140 towards pest ingress 124 causes finger 176 to push sealing surface 172 axially away from opening 152 in cap 150. In this manner, opening 123 in top 120 communicatively connects to opening 152 in cap 150 and openings 174 in plug 170. Target pests, drawn by the lure within bag 142, thus pass through funneled opening 123 in top 120, and then through opening 152 in cap 150 and finally one of the openings 174 in plug 170 before entering bag 142. Once locked to top 120, bag 142 may be disposed within canister 110, and top 120 closes opening 114 of canister 110.

Figure 7:
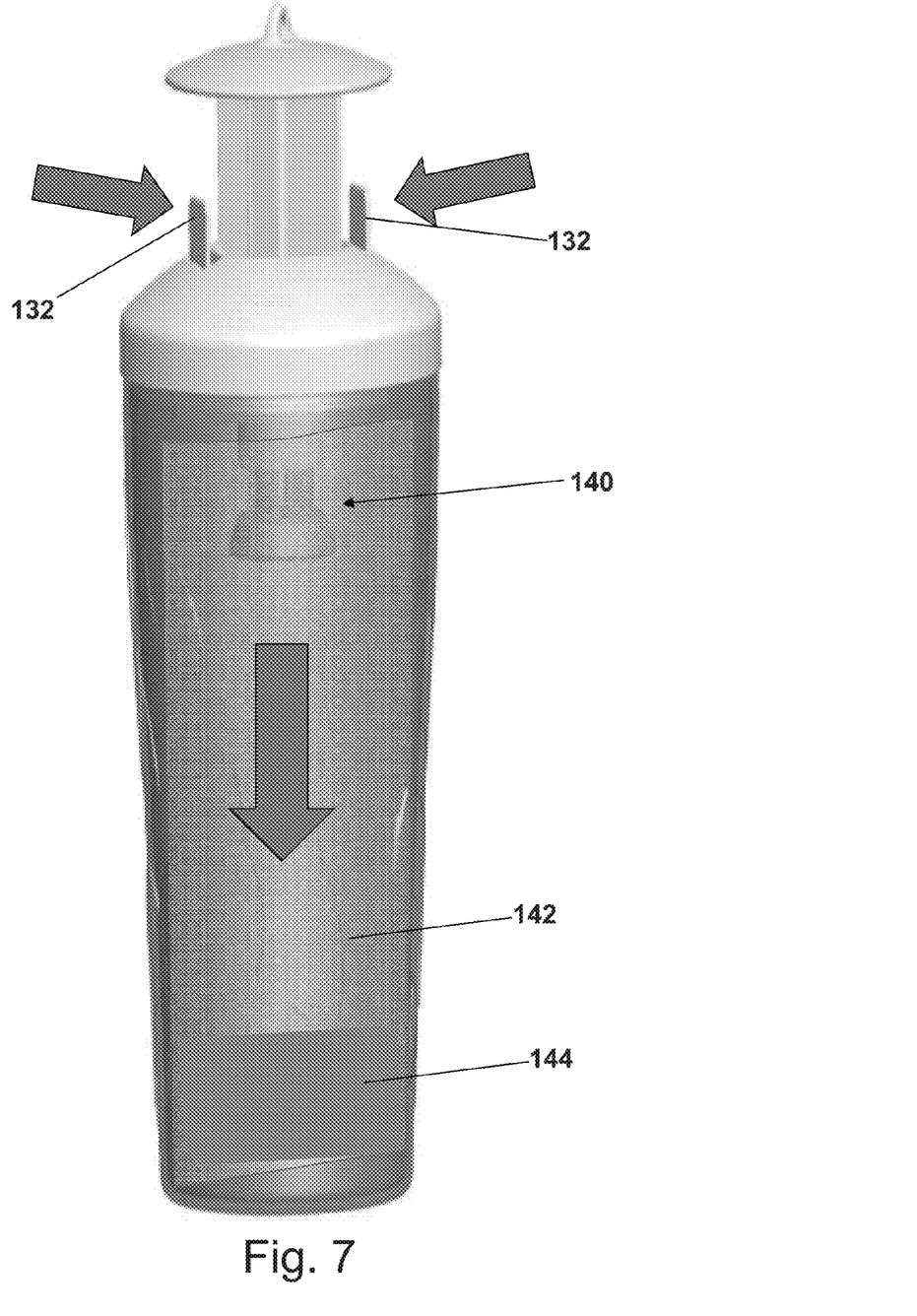
FIG. 7 illustrates releasing the bag and associated sealing mechanism of FIG. 5 from the canister top.
Figure 8:
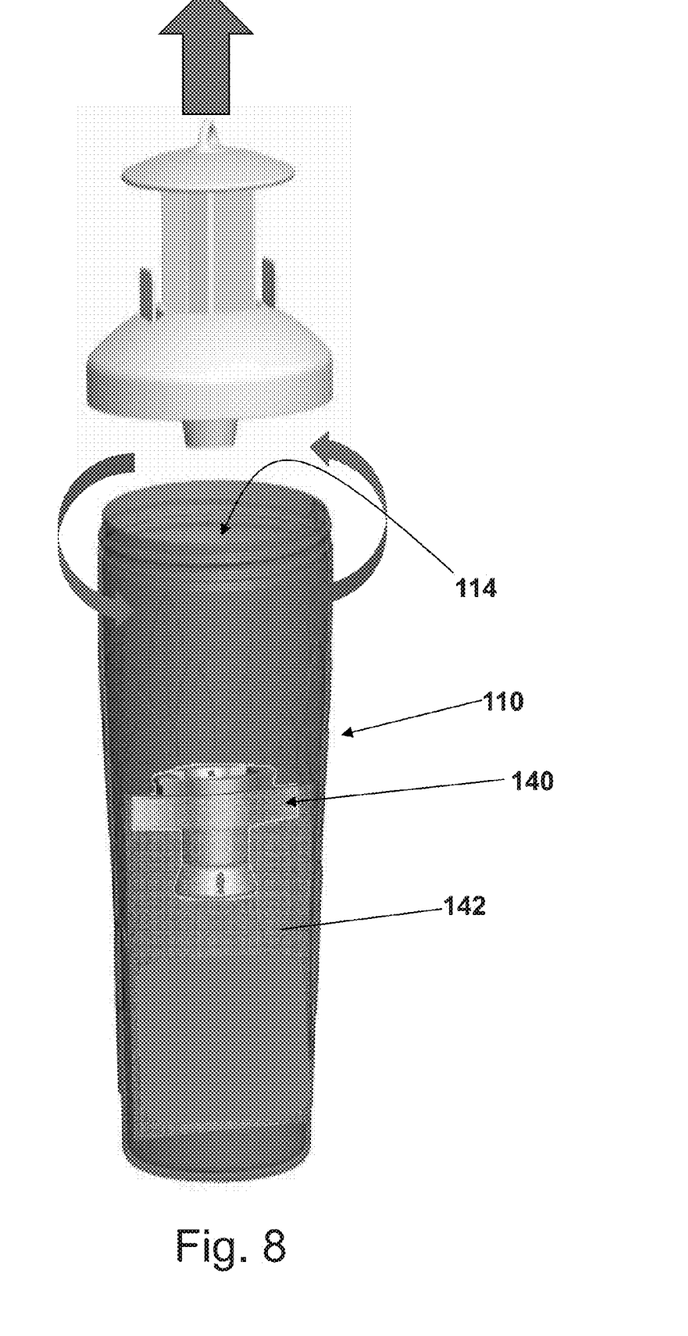
FIG. 8 illustrates a disposal operation with the released bag and associated sealing mechanism.

When actuation ends 132 of release mechanism 130 are pushed towards each other, this movement causes a levering action that forces the corresponding locking ends 134 apart, which thus disengage from flange 156. Additionally, the stored bias of compressed biasing member 160, pushing against distal edge 129 of support 127, tends to push bag sealing mechanism 140 away from top 120. As this occurs, sealing surface 172 of plug 170, drawn by biasing member 160 via flange 178, moves to close opening 152 in cap 150. The contents 144 within bag 142 are thus sealed within bag 142 and cannot escape through opening 152. The consumer thus need not worry about any mess associated with leakage of contents 144 from bag 142. Top 120 may then be removed from canister 110, and canister 110 may be upended over a garbage can or the like, so that bag 142, and its attendant bag sealing mechanism 140, slide from canister 110 through opening 114 and into the garbage can. The consumer thus also does not need to touch bag 142 when disposing of bag 142.

Figure 9:
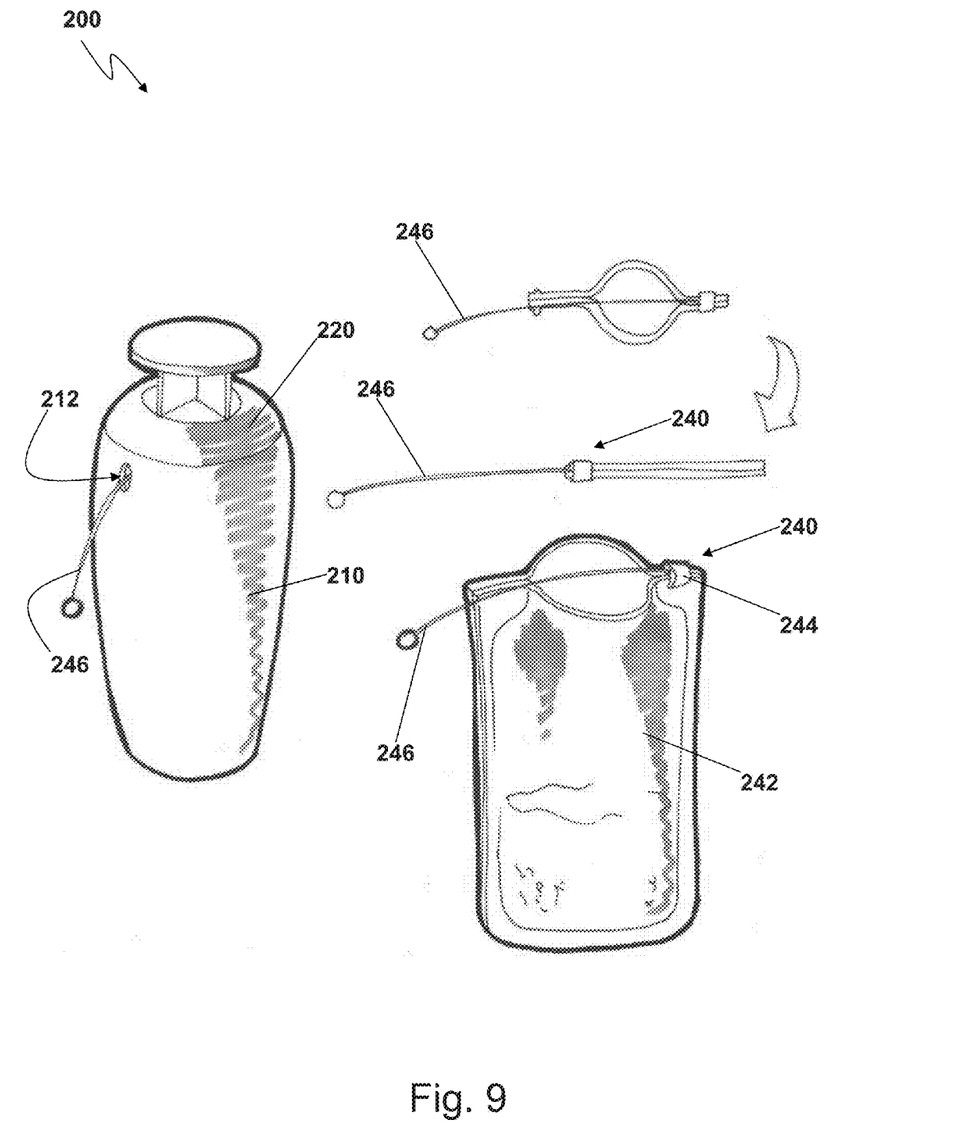
FIG. 9 illustrates another embodiment trap.

A second embodiment pest trap 200 is shown in FIG. 9. A bag 242, loaded with a lure, includes a zip-lock mechanism 240 that includes a zipper 244 and a pull 246 connected to zipper 244. In a known manner, zipper 244 is capable of sealing closed the top of bag 242. Pull 246 extends through a slot or opening 212 in a canister 210 within which bag 242 is disposed. By pulling on pull 246, zipper 244 is urged forward so as to seal the top of bag 242. A top 220 may then be removed from canister 210, and the canister 210 upended to dump bag 242 and its sealed contents.

Figure 10:
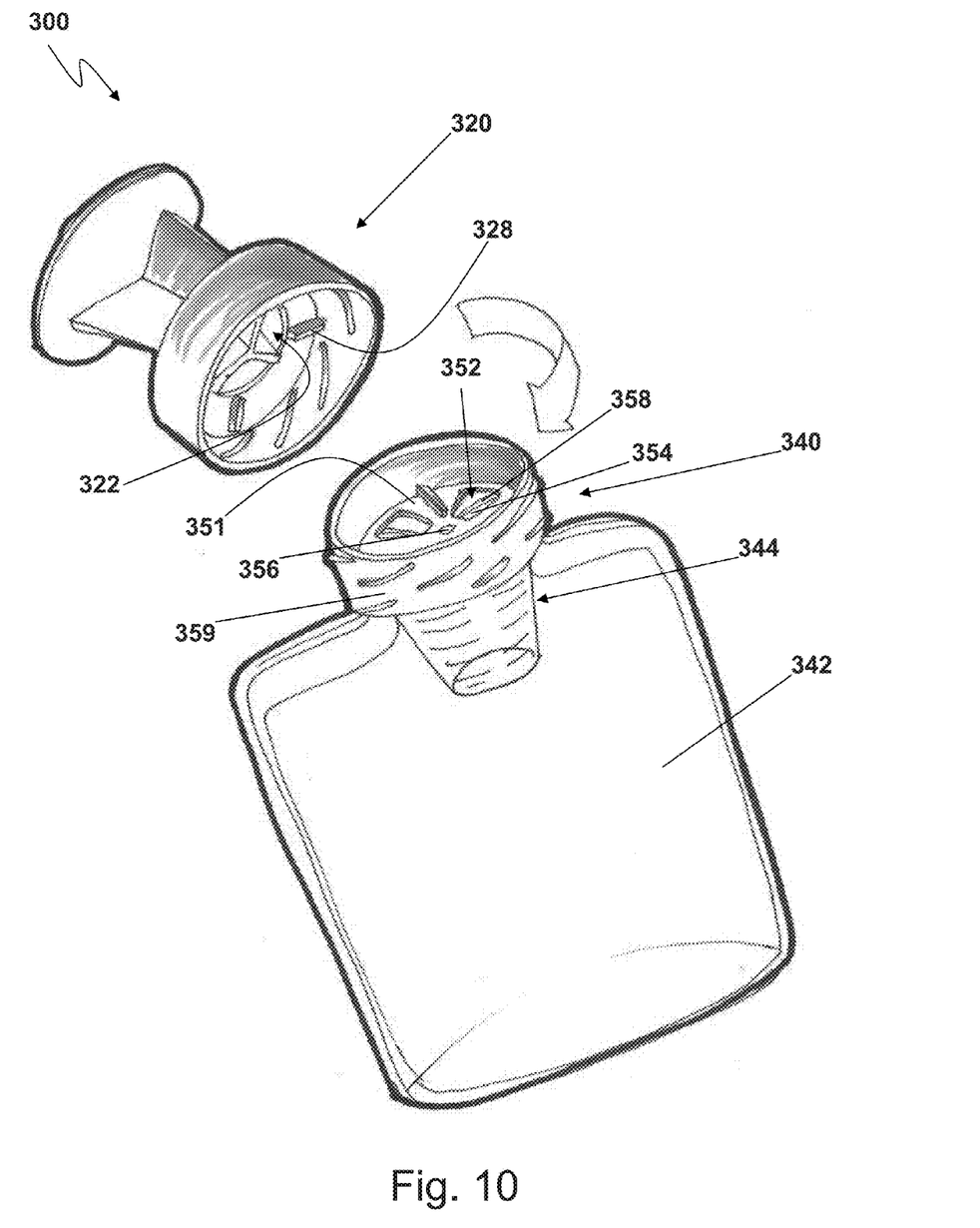
FIG. 10 illustrates yet another embodiment trap.

A third embodiment pest trap 300 is shown in FIG. 10. A bag 342, loaded with a lure, includes a rotatable sealing mechanism 340 that releasably engages with a top 320 for sealing purposes. Rotatable sealing mechanism 340 includes a base surface 351 and sealing wall 359 extending away from base surface 351. Bag 342 is coupled, such as glued or welded, to sealing wall 359 or base surface 351. Base surface 351 includes openings 352 sized to pass the target pests and which provide access to the interior of bag 342. A rotatable sealing surface 354 is disposed adjacent to openings 352 and rotates about a pivot 356. Rotatable sealing surface 354 includes tabs 358 that extend towards top 320 to engage with corresponding tabs 328 on top 320. Rotatable sealing surface 354 is biased so as to tend to rotate in a direction that covers openings 352, but can be rotated in an opposite direction to expose openings 352. Any suitable mechanism may be employed to provide such a bias, such as a spring or the like. Cap 320 rotatably engages with sealing wall 359, and in doing so, tabs 328 on top 320 engage with tabs 358 on sealing surface 354 to uncover openings 352. Target pests, attracted by the lure in bag 342, pass through openings 322 in top 320 and then through openings 352 in base surface 351 where they enter into a funnel 344 that exits into bag 342. When top 320 is unscrewed from sealing mechanism 340, the biased sealing surface 354 rotates so as to cover openings 352 and thus seal the contents of bag 342, which may then be easily disposed.

Figure 11:
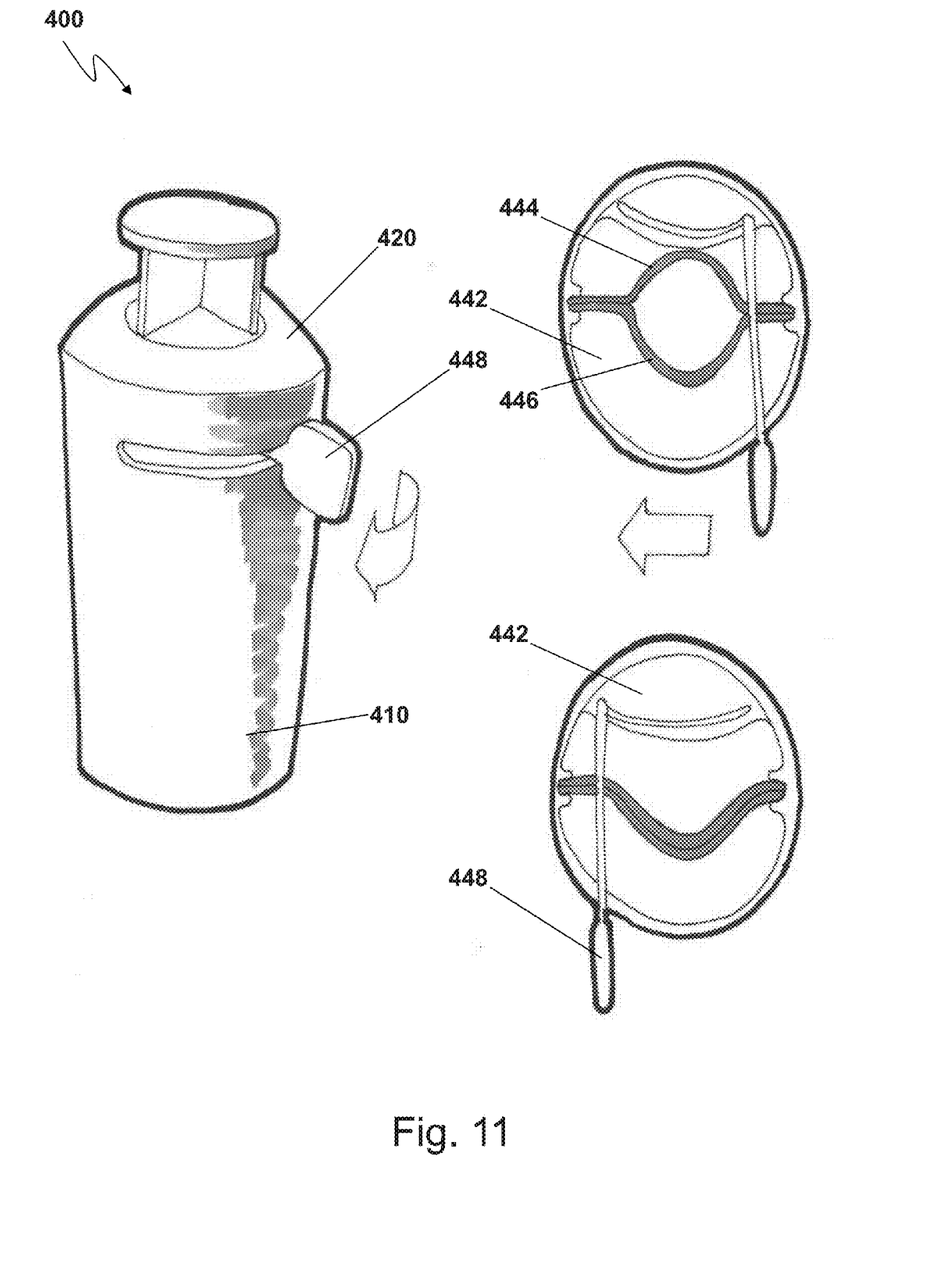
FIG. 11 illustrates a further embodiment trap.
Figure 12:
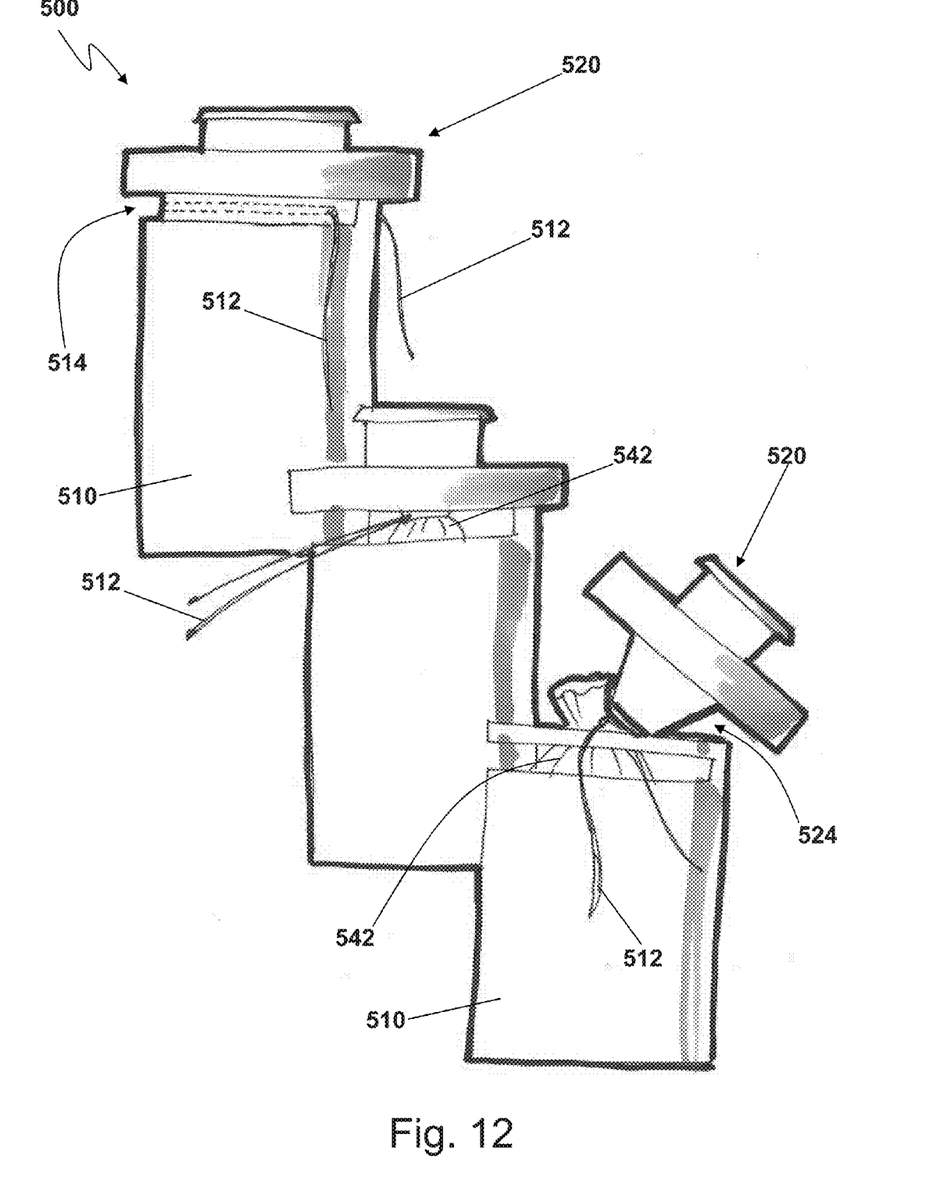
FIG. 12 illustrates yet a further embodiment trap.

A fourth embodiment pest trap 400 is shown in FIG. 11. A top of bag 442 may include opposed elastic members 444, 446, each of which is longer than a width of bag 442, and thus are elastically bent. In one configuration, elastic members 444, 446 are bent away from each other, and thereby hold the mouth of bag 442 open. However, when one of the elastic members 444 is pushed far enough towards the other elastic member 446, the first elastic member 444 will flip its bent configuration and bend towards the second elastic member 446, rather than away from the second elastic member 446, and thus seal shut the mouth of bag 442. To facilitate this closing operation, pest trap 400 may include a sliding tab 448, which slides past the first elastic member 444 and in so doing forces the first elastic member 444 towards the second elastic member 446 to close the bag 442. Once sealed, the top 420 can be removed from the canister 410, and sealed bag 442 can be disposed of in a convenient manner.

A fifth embodiment pest trap 500 is shown in FIG. 11. Top 520 include a funnel-shaped pest ingress 524. Disposable bag 542 is coupled to top 520 so that the opening of bag 542 surrounds insect ingress 524. An upper portion of canister 510 includes a slot 514 that extends around a majority of the circumference of canister 510, and through which bag 542 can be accessed. A sealing line 512, such as string, twine or the like, extends through slot 514 on one side of insect ingress 524, so that a top portion of bag 542 is disposed between insect ingress 524 and sealing line 512. Sealing line 512 may be pre-attached to one side of bag 542. To seal bag 542, both ends of sealing line 512 are brought around to the opposite side of insect ingress 524 and then knotted. In so doing, the resultant knot will surround the mouth of bag 524 and then pull bag 524 away from insect ingress 524. The knot can then be cinched, thereby tying bag 524 closed. Top 520 can be removed, and sealed bag 524 dumped from canister 510.

Those skilled in the art will recognize that the present invention has many applications, may be implemented in various manners and, as such is not to be limited by the foregoing embodiments and examples. Any number of the features of the different embodiments described herein may be combined into a single embodiment, the locations of particular elements can be altered and alternate embodiments having fewer than or more than all of the features herein described are possible. Functionality may also be, in whole or in part, distributed among multiple components, in manners now known or to become known.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. While there has been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art.

What is claimed is:

1. A disposable device for a pest trap, the disposable device comprising:
   a trap bag for holding trapped pests; and
   a sealing mechanism for sealing the trap bag for disposal, the sealing mechanism comprising:
      a cap coupled to the trap bag, the cap comprising an opening sized to pass the pests for ingress into the trap bag;
      a plug movably disposed with respect to the cap, the plug comprising a sealing surface sized to block the opening in the cap, wherein when the plug is in an open position the sealing surface exposes at least a portion of the opening in the cap and when the plug is in a closed position the sealing surface blocks the opening in the cap, the plug further comprising a finger extending towards the pest trap for mechanically engaging with the pest trap; and
      a biasing member for biasing the plug towards the closed position.

2. The disposable device of claim 1 wherein the plug comprises a flange and at least an opening disposed between the flange and the sealing surface, the biasing member compressed between the flange and the cap.

3. The disposable device of claim 2 wherein the finger extends from the sealing surface towards the opening in the cap.

4. The disposable device of claim 3 wherein the flange is slidably disposed in the cap between an external surface of the cap and the opening in the cap.

5. The disposable device of claim 1 wherein the cap comprises a flange for engaging with a clamp on the pest trap.

6. The disposable device of claim 1 wherein the cap comprises a tapered surfaces on opposite sides of the cap, and the trap bag is bonded to the tapered surfaces.

7. A pest trap comprising:
   a canister comprising a containment space;
   a disposable pest trap bag disposed within the containment space, the disposable pest trap bag comprising a sealing mechanism for sealing the disposable pest trap bag; and
   a top cover for covering a top of the canister, the top cover comprising a first opening sized to pass pests for ingress into the disposable pest trap bag and a release mechanism for engaging with and disengaging from the sealing mechanism of the disposable pest trap bag;
   wherein the sealing mechanism comprises:
   a cap coupled to the pest trap bag, the cap comprising a second opening sized to pass the pests for ingress into the pest trap bag;
   a plug movably disposed with respect to the cap, the plug comprising a sealing surface sized to block the second opening, wherein when the plug is in an open position the sealing surface exposes at least a portion of the second opening and when the plug is in a closed position the sealing surface blocks the second opening, the plug further comprising a finger extending towards the first opening for mechanically contacting a structure of the top cover; and
   a biasing member for biasing the plug towards the closed position.

8. The pest trap of claim 7 wherein the plug comprises a flange and at least an opening disposed between the flange and the sealing surface, the biasing member compressed between the flange and the cap.

9. The pest trap of claim 8 wherein the finger extends from the sealing surface towards the first opening.

10. The pest trap of claim 9 wherein the flange is slidably disposed in the cap between an external surface of the cap and the second opening.

11. The pest trap of claim 7 wherein the cap comprises a flange for engaging with a locking lever on the top cover.

12. The pest trap of claim 11 wherein the locking lever passes through the top cover and comprises an actuation end extending over a top surface of the top cover, an engaging surface that contacts the top cover, and a locking end that extends below the top surface of the top cover, the locking end mechanically engaging with the flange of the cap.

13. The pest trap of claim 11 further comprising two locking levers, each locking lever passing through the top cover and comprising an actuation end extending over a top surface of the top cover, an engaging surface that contacts the top cover, and a locking end that extends below the top surface of the top cover, the locking ends mechanically engaging with the flange of the cap.

14. The pest trap of claim 7 wherein the cap comprises a tapered surfaces on opposite sides of the cap, and the pest trap bag is bonded to the tapered surfaces.

\* \* \* \* \*